United States Patent
Flodquist

[11] Patent Number: 5,736,005
[45] Date of Patent: Apr. 7, 1998

[54] SCRAPER DEVICE FOR A CONTINUOUS DIGESTER

[75] Inventor: Jan Flodquist, Skoghall, Sweden

[73] Assignee: Kvaerner Pulping Technologies Aktiebolag, Sweden

[21] Appl. No.: 530,120

[22] PCT Filed: Apr. 5, 1994

[86] PCT No.: PCT/SE94/00300
§ 371 Date: Oct. 5, 1995
§ 102(e) Date: Oct. 5, 1995

[87] PCT Pub. No.: WO94/24363
PCT Pub. Date: Oct. 27, 1994

[30] Foreign Application Priority Data
Apr. 21, 1993 [SE] Sweden .................. 9301304

[51] Int. Cl.$^6$ ........................ D21C 7/08
[52] U.S. Cl. .............. 162/52; 162/243; 162/246; 366/169.1
[58] Field of Search .............. 162/52, 246, 57, 162/243; 366/169.1, 170.4

[56] References Cited

U.S. PATENT DOCUMENTS 4,056,429 11/1977 Richter et al. .................. 162/17
4,236,961 12/1980 Green .................. 162/52
5,271,672 12/1993 Peck .................. 162/243

OTHER PUBLICATIONS

Drawing 1-2225-90R2 by Kamyr Inc., Glenn Falls, NY.
Drawing 0-2225-18R15 by Kamyr, Inc., Glenn Falls, NY.

Primary Examiner—Donald E. Czaja
Assistant Examiner—Dean T. Nguyen
Attorney, Agent, or Firm—Ronald P. Kananen

[57] ABSTRACT

The present invention relates to a scraper device, preferably a bottom scraper arranged at the bottom of a continuous digester for pulp production, which scraper comprises at least one scraper arm (12), preferably arranged with shovel members (13), a shaft (6) and drive device (15) for driving the scraper arm (12), an axially extending bore (8) inside the shaft (6) for supplying liquid, and a sealing arrangement (3, 4, 5, 14) for sealing between the atmosphere and the medium in which the scraper arm (12) is intended to rotate, the bore (8) extending along only a limited part of the shaft (6) at that end of the shaft (6) on which the scraper arm (12) is arranged.

6 Claims, 2 Drawing Sheets

SCRAPER DEVICE FOR A CONTINUOUS DIGESTER

TECHNICAL FIELD

The present invention relates to a scraper device, preferably a bottom scraper arranged at the bottom of a continuous digester for pulp production, the purpose of the scraper being to ensure an even feeding-out from a container.

In the text which follows reference is made only to a bottom scraper arranged at the bottom of a continuous digester for pulp production. However, the person skilled in the art will realise that the invention is not limited to this illustrative use.

PRIOR ART AND PROBLEMS

It has long been known to use a scraper device at the bottom of a continuous digester in order to ensure a continuous feeding-out of pulp from the digester. The scraper device consists of a number of scraper arms which are arranged on the shaft disposed vertically for the operation. The movement of the arms in the pulp suspension counteracts bridge formation and channelling and other undesirable effects, as a result of which a continuous feeding-out of pulp having the desired properties is ensured.

From an early stage, the above mentioned shaft for operating the said scraper arms has been used for adding liquid in the lower part of the digester. Liquid has in this case been added by making the whole shaft hollow and introducing the liquid by this route. Liquid was added in the first place in order to wash the pulp. Later, this bore has also been used to add liquid in order to dilute the pulp for the purpose of ensuring the feeding-out, which is sometimes found to be necessary in conjunction with exceptionally large digesters.

This known solution, with a continuous bore in the drive shaft, results in a number of disadvantages. Because the liquid is supplied to the bore at the lower end, it has not been possible to drive the shaft directly, and, instead, an intermediate transmission, normally a gear transmission, has been necessary. Such a transmission is not only expensive to purchase and expensive to install, but also requires relatively extensive maintenance.

In addition, in the case of a shaft with a continuous bore, bearing problems have been experienced when the liquid which is added through the pipe exceeds a certain temperature since this has led to carbonization and the like which adversely affects the useful life of the bearing.

Perhaps the most serious problem is, however, the sealing problem, associated with sealing between the medium inside the vessel, usually pulp, and the atmospheric pressure at which the lower part of the shaft is situated. A stuffing box is normally used for this sealing. On account of the position of this stuffing box, the entire digester must be emptied in order to be able to replace the box. To empty a digester is both costly and difficult. This sealing is thus an extremely critical component in a conventionally designed digester. Due to the fact that at the one end it is sealed directly against a pulp suspension, its operating conditions are in addition exceptionally arduous.

SOLUTION AND ADVANTAGES

An object of the present invention is to propose a scraper device which remedies at least some of the above mentioned problems. This object is achieved by means of a scraper device according to the invention, preferably a bottom scraper arranged, at a continuous digester for pulp production, which scraper comprises at least one scraper arm (12), preferably arranged with shovel members (13), which scraper arm (12) is arranged at a first end of a rotatable shaft (6), a drive device (15) for driving the said shaft (6), an axially extending bore (8) inside the said shaft (6) for supply of liquid, and a sealing means (3, 4, 5, 14) for sealing between the atmosphere and the medium in which the said scraper arm (12) is intended to rotate, the said bore (8) extends along only a limited part of the said shaft (6) in the said first end of the shaft (6) at which the said scraper arm (12) is arranged, and the said bore (8) communicates with at least one liquid supply channel (1), which opens out into a preferably annular space (16).

The above features are known from U.S. Pat. No. 4,056,429, from which the invention is distinguished by the following, i.e. the invention is characterized in that said supply channel (1), which, without going through the shaft (6), opens out into an area in, or in the vicinity of, the said sealing means (3, 4, 5, 14) and that said space (16) is delimited towards the outside by a plate (2) or the like and a housing (3, 4) fixed on the said plate (2) or the like, and is delimited towards the inside by the said shaft (6), and that there is arranged, between the plate (2) or the like and the said shaft (6), a seal (14), preferably a stuffing box, which is accessible from the side with atmospheric pressure, so that a good possibility of inspection and maintenance is obtained, and that there is arranged, on the said shaft (6), a co-rotating sealing part (5), preferably of the labyrinth seal type, which provides a seal against the liquid in the said space (16) so that the said medium, which is usually pressurized, is prevented from flowing into the said space (16).

In this way it is possible to provide an advantageous solution concerning the sealing of the shaft and it is also possible for the shaft to be driven directly at the lower end of the shaft. In addition, such a construction offers the possibility of mounting the shaft in such a way that the bearings do not surround any liquid-conducting bore in the shaft.

In addition, by providing a seal, preferably a stuffing box, accessible from the side with atmospheric pressure, between the said plate or the like and the said shaft, it is possible to replace the said seal simply, without needing to empty the digester.

Furthermore, it is possible to arrange a diaphragm seal, for example a labyrinth seal, in an advantageous manner between the said space and a part co-rotating with the shaft, so that the pulp suspension is prevented from entering the said space, as a result of which the said stuffing box acquires optimum operating conditions.

BRIEF DESCRIPTION OF THE FIGURES

The invention will be explained in greater detail herein below by means of the attached figures, in which.

DETAILED DESCRIPTION OF THE INVENTION

Figure 1:
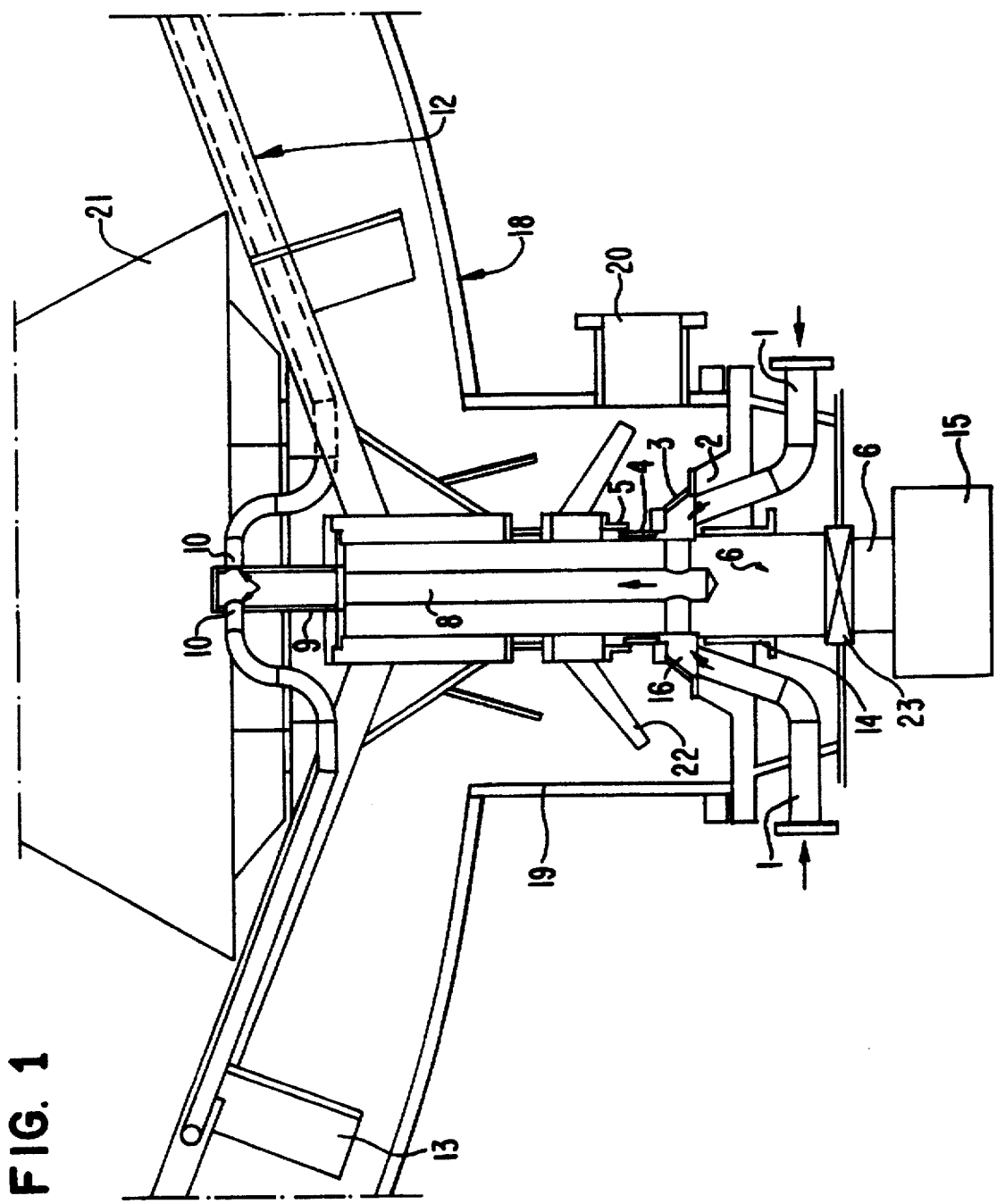
FIG. 1 shows a preferred embodiment of a scraper device arranged at the bottom of a digester, in a vertical section.

FIG. 1 shows parts of a digester shell 18 which at the bottom is provided with a bottom seat 19. In such a digester, chippings are fed in at the top and cooked pulp is fed out via the feed-out opening 20 in the bottom seat 19. A plate 2 is fitted at the end of the bottom seat 19. In this plate 2 there is a central hole through which a shaft 6 extends. Arranged at the upper end of the shaft 6 are two scraper arms 12. The shaft 6 is driven at its lower end by means of a direct drive device 15 (shown diagrammatically).

The shaft 6 is arranged with an axially extending bore 8. At the upper end of the shaft 6 this bore 8 communicates with a sleeve 9, which in turn is in open communication with two branch lines 10. Each branch line 10 then connects the bore 8 to liquid channels 11 which have been arranged on each scraper arm 12, on that side which is situated to the rear with respect to the direction of rotation. The lower end of the bore 8 is in open communication with a radially extending passage 7 through the shaft 6. During rotation, the openings of the said passage 7 at all times open into an annular space 16. This annular space is delimited towards the outside by a rotationally symmetrical housing 3, 4 and by parts of the said plate 2. Two liquid supply channels 1 extend through the plate 2 and open into the annular space 16. The reason for using two liquid supply channels is to keep the dimensions small. At the top, towards the pulp suspension in the digester 18, the annular cavity 16 is sealed off by means of a diaphragm seal 4, 5. This diaphragm seal is preferably formed in a manner known per se by means of a labyrinth seal, in which overlapping sealing parts project towards each other on the one hand from the fixed part of the rotationally symmetrical housing 4 and on the other hand from the upper sealing section 5 co-rotating with the shaft. This sealing section is preferably arranged on a further shovel device 19.

Figure 2:
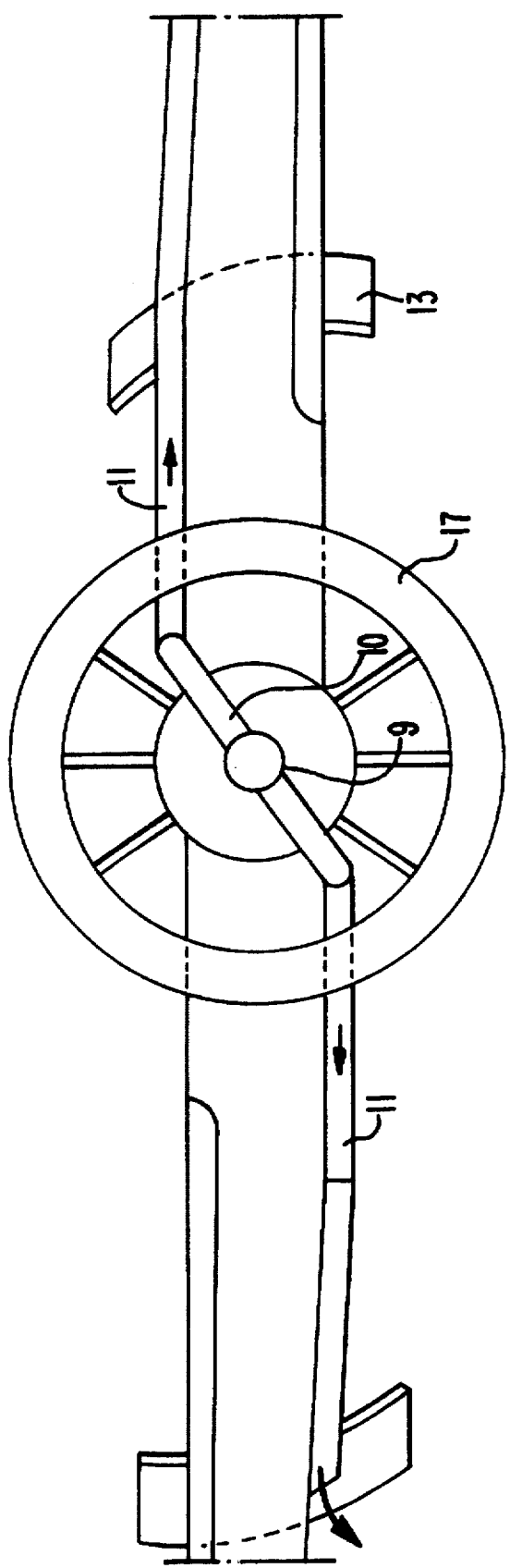
FIG. 2 shows a plan view of certain parts of the said scraper device.

At the bottom, the annular space 16 is sealed off by means of a stuffing box 14, the gland of which is therefore accessible from the outside. At least one bearing 23, such as a ball bearing or a roller bearing, is provided for supporting the shaft 6. FIG. 2 shows, from above, a scraper device according to a preferred embodiment of the invention. It can be clearly seen here that the liquid channels 11, which have been arranged on the scraper arms 12, are fixed on that side of the scraper arm which does not meet the pulp when the scraper arms 12 rotate. It is also shown that the scraper device is arranged centrally with a ring 17 for the purpose of forming a support for a conical plate 21 which distributes the pulp outwards towards the periphery in order to avoid channelling, etc.

The function of a scraper device according to the invention will be explained in greater detail herein below. The scraper arms 12 are rotated by means of the drive device 15 rotating the vertical shaft 6 in a clockwise direction in the vertically arranged digester vessel 18. Dilution liquid is supplied through the outer liquid supply channels 1 and empties out into an annular cavity 16, after which it penetrates through a radial passage 7 into the shaft 6 and thereafter passes through the bore 8 in the shaft 6 to the sleeve 9 arranged at the end of the shaft. The liquid is then guided further from the sleeve 9 through lines 10, 11 which are arranged on each scraper arm 12, and it finally empties out into the pulp suspension, which is in this way diluted. The diluted liquid is fed by means of the shovel arms 13 into and down towards the bottom seat 19 and then out through the feed-out opening 20. A further slight dilution of the suspension may take place at the level of the feed-out opening 20 because the sealing arrangement 4, 5 between the annular cavity 16 and the pulp suspension around it is not completely tight, as the dilution liquid is added at a higher pressure then the pressure existing in the pulp suspension. By means of the shovel members 22 arranged at the bottom, even this possible dilution liquid is efficiently mixed, and the pulp is guaranteed an even feeding-out through the feed-out opening 20.

A further advantage of the invention is, as has already been indicated, that the bearing can be arranged at a distance from the dilution liquid supply point, as a result of which the bearing is not adversely affected in the event of extremely hot liquid being added. In addition, there is of course the considerable advantage that the shaft 6 can be operated directly. Finally, there is the considerable advantage that the stuffing box 14 functions against a medium without a fibre content or another undesirable content, which can, for example, be abrasive. Perhaps the greatest advantage of the invention is that the said stuffing box 14 can be replaced without the digester 18 having to be emptied of its contents, since the diaphragm seal 4, 5 always provides a certain sealing between the pulp suspension in the digester 18 and the annular cavity 16 with which the stuffing box 14 is associated.

The invention is not limited to the embodiment shown above, but instead can be varied within the scope of the patent claims which follow; thus, for example, it is obvious to the person skilled in the art that it is possible to use only one supply channel 1 for the dilution liquid, or more than two. Other obvious modifications are the number and the design of the scraper arms 12 etc., etc.

I claim:

1. A scraper device arranged at a bottom of a continuous digester for pulp production, comprising:

a vertically arranged rotatable shaft extending through the bottom of the digester;

at least one scraper arm arranged inside the digester, said scraper arm being arranged at an upper end of said shaft;

a driver device attached at a lower end of said shaft for driving said shaft;

an axially extending bore inside said shaft for supplying liquid into the digester, said bore extending from an upper end of said shaft along only a limited part of said shaft;

a space arranged around a limited part of said shaft and in a vicinity of a lower end of said bore, said space being delimited toward the outside by a plate forming a lower limiting surface of the space, a housing fixed on said plate forming upper and side limiting surfaces of the space, and said space being delimited toward the inside by said shaft;

at least one liquid supply channel communicating with said space;

passages arranged in said shaft communicating between said bore and said space, whereby liquid can flow from the supply channel into said space, through said passages into said bore and into the digester;

a first sealing means arranged between said housing and said shaft, said first sealing means providing a seal against the liquid in said space so that a medium in the digester, which is usually pressurized, is substantially prevented from flowing into said space;

a second sealing means arranged between said plate and said shaft, wherein said second sealing means is accessible from a side with atmospheric pressure, whereby inspection and maintenance of said second sealing means is facilitated; and bearing means arranged on said shaft for supporting said shaft, wherein no bearings are arranged on the part of said shaft containing said bore, whereby no bearings will be affected by any increase in temperature originating from said liquid.

2. The scraper device according to claim 1, wherein said first sealing means is of a labyrinth seal type.

3. The scraper device according to claim 1, wherein said second sealing means is a stuffing box.

4. The scraper device according to claim 1, wherein said shaft is driven directly by said drive device by coupling said drive device together with the lower end of said shaft without any intermediate transmission.

5. The scraper device according to claim 4, wherein at least two scraper arms are arranged inside the digester, each scraper arm having a liquid channel, and each liquid channel opening out at a different radial distance with respect to a center of said shaft.

6. The scraper device according to claim 1, wherein said bore is in communication with at least one liquid channel which is arranged on at least one of the scraper arms and opens out at a considerable distance, at least exceeding twice the diameter of the shaft, from a center of said shaft.

* * * * *